United States Patent [19]

Reynaud

[11] Patent Number: 4,714,932

[45] Date of Patent: Dec. 22, 1987

[54] INK JET ANGULARLY-ADJUSTABLE NOZZLE PRINTHEAD

[75] Inventor: Jean-Louis Reynaud, Bourg Lès Valence, France

[73] Assignee: Imaje S.A., Bourg Lès Valence, France

[21] Appl. No.: 916,483

[22] PCT Filed: Jan. 20, 1986

[86] PCT No.: PCT/FR86/00014

§ 371 Date: Sep. 16, 1986

§ 102(e) Date: Sep. 16, 1986

[87] PCT Pub. No.: WO86/04298

PCT Pub. Date: Jul. 31, 1986

[30] Foreign Application Priority Data

Jan. 24, 1985 [FR] France ................................ 85 01159

[51] Int. Cl.[4] .......................... G01D 15/18; B05B 3/14

[52] U.S. Cl. .................................. 346/75; 346/140 R; 239/102.2; 239/600; 239/690

[58] Field of Search ............................. 346/75, 140 R; 239/DIG. 4, 102.2, 600, 690, 708

[56] References Cited

U.S. PATENT DOCUMENTS 4,303,928 12/1981 Sugiyama et al. .................... 346/75
4,406,405 9/1983 Marichy .............................. 239/102
4,538,763 9/1985 Perry et al. .......................... 239/600
4,617,574 10/1986 Miller et al. .......................... 346/75

*Primary Examiner*—E. A. Goldberg
*Assistant Examiner*—Gerald E. Preston
*Attorney, Agent, or Firm*—Roland Plottel

[57] ABSTRACT

Such a device comprises a plurality of modules (1) each having a body (4) presenting an ink inlet (2) and a purging orifice (3), co-operating with the gun (5) of which the periphery carries two sets of O-rings respectively delimiting the ink supply chamber and the purge chamber. Said particular arrangement provides for the sealing while permitting a rotation (α) on 360° of the gun and therefore a setting of the jet direction with respect to the axis of the nozzle ejecting the ink drops. Each of the modules (1) is further orientable about an axis (31) according to an angle (β). The invention applies to the printing of multiple writing lines and to the optional covering of said lines.

6 Claims, 4 Drawing Figures

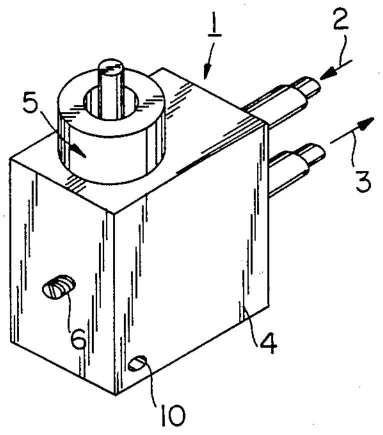
FIG.1
FIG.2
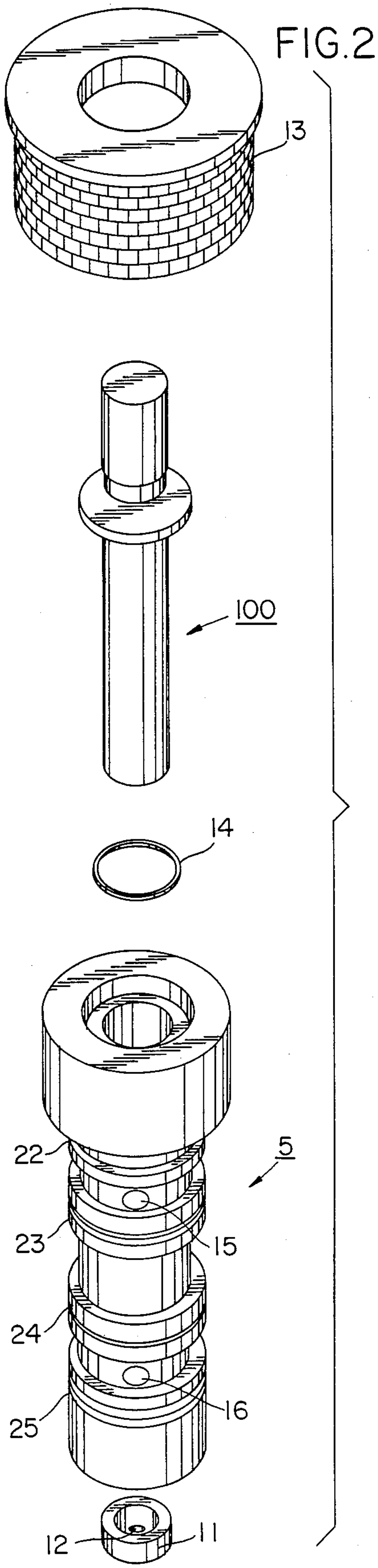

INK JET ANGULARLY-ADJUSTABLE NOZZLE PRINTHEAD

The invention concerns a multi-nozzle ink projection writing device. More precisely, it concerns a modular unit consisting of a multiple ink jet printer. The ink jet printing technique consists of supplying a continuous jet of graded drops supplied by a modulations system and then electrostatically charging these drops by means of charging electrodes, and finally deflecting each drop by means of an electric field so that if the medium upon which it is desired to write and the writing device are in relative displacement, the formation of a printing matrix is obtained.

The problem becomes more complicated as soon as it is desired to have several jets working together, in particular for the purpose of increasing the number of lines. The particular aim of the present invention is to provide a device which enables this result to be obtained. It appears in the form of writing modules, each fitted with a nozzle. One of the major characteristics of the invention resides firstly in the simple and effective means for regulating the direction of each jet at the level of each nozzle and secondly, in the relative positioning means of the modules. All these performances are obtained with such a device according to the invention, the spatial requirement of which nevertheless remains extremely small.

More precisely, the invention concerns a multi-nozzle ink projection writing device, characterized in that each nozzle belongs to a module comprising a body supplied with an ink supply and drain outlet and working in conjunction with a gun which carries the ink piezoelectric excitation means and is equipped at its periphery with two sets of O-ring seals demarcating the ink feed chamber and the drain chamber so that the orientation of the jet in relation to the opening of the ejection nozzle is adjusted by rotation of the said chamber according to an angle which can vary from 0° to 360°.

The invention will be more clearly understood from the explanations which follow and from the attached figures, i.e.:

FIG. 1 is a diagramatic illustration of a module conforming to the invention;

FIG. 2 is an exploded view illustrating a combination of the means according to the invention enabling the direction of the jet to be regulated;

Figures 3, 4:
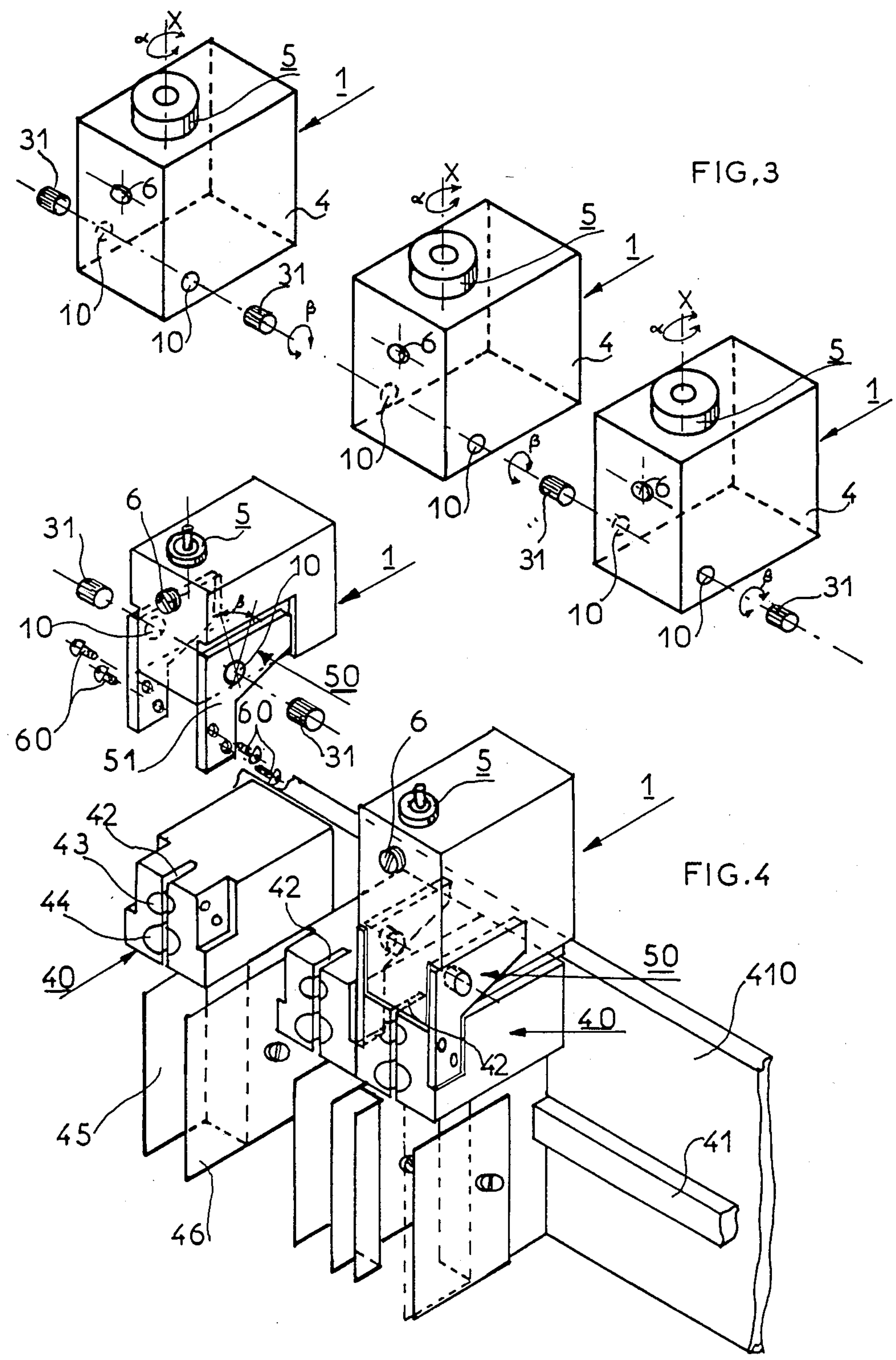

FIG. 3 diagrammatically illustrates an example for the disposition of a large number of modules;

FIG. 4 is an example for the embodiment of a multi-nozzle writing device conforming to the invention.

For the sake of more clarity, the same elements bear the same references as regards all the figures.

As shown in FIG. 1, a basic element of a device according to the invention is made up of a modulation body 1 appearing in a modular form and is designed to work in conjunction with other identical modules 1 in order to enable different types of printing to be obtained; more numerous lines, overlapping of lines, variable spacing of lines, etc. Such a module 1 comprises an inlet 2 connected to the ink supply (not shown on the figure) and a drain outlet 3 of the ink circuit. This module 1 comprises a body 4 serving as a support for the gun 5 introduced into this body 4 and tightened by a tightening means 6, such as a screw, for example. A passage 10 is provided to receive a spindle (not shown here, but described by means of the figures following) around which the body 4 is able to rotate.

An exploded view of FIG. 2 illustrates the gun 5 designed to receive firstly the piezoelectric means 100 (transducer plus resonator) and secondly the nozzle-holder 12 plate 11, together with the imperviousness means provided by a packing box 13 and a seal 14, the nozzle-holder plate 11 being fitted to the extremity of the gun by an impervious coupling. This gun 5 comprises an ink feed orifice 15 and an outlet 16 for draining. Finally, according to a major characteristic of the invention, this gun is equipped at its periphery with grooves designed to receive a first and second set of O-ring seals (22 and 23), (24 and 25) respectively positioned upstream and downstream of each ink feed 15 and drain 16 orifice. This combination of O-ring seals (22 and 23), (24 and 25) ensures the imperviousness of the draining and feed chambers and enables the orientation of the ink jet to be perfectly regulated by the rotation of the ink feed chamber. This rotation, according to ($\alpha$), could be total, i.e. could vary from 0° to 360°.

In particular, this allows for mitigation of the jet centering and perpendicularity defects inherent in the techniques currently used to countersink the pierced ruby which generally constitutes the orifice of the nozzle 12. Thus, these defects can be eliminated and the jet of drops can be perfectly orientated, whilst the ink feed chamber retains full imperviousness. According to the invention and owing once again to this disposition, in order to obtain a more effective draining of the printing head feed circuit, the gun 5 may be replaced by a simple hollow tube fitted with sets of O-ring seals (22,23) and (24,25), but with the nozzle unprovided.

As already mentioned earlier, a large number of modules 1 equipped with their gun 5 can be fitted so as to function collectively. An illustration of such a structure is shown on FIG. 3. In the example chosen, three modules 4 are positioned on hinge pins 31 passing through the orifices 10 described by means of FIG. 1. According to another characteristic of the invention, such a structure allows for a first rotation ($\beta$) thanks to the spindles 31, and a second rotation according to ($\alpha$) around the vertical axis X owing to the presence of the two sets of O-ring seals (22,23) and (24,25) defined earlier. Thus, a simple adjustment according to two degrees of freedom ($\alpha$) and ($\beta$) can be made, module by module and fully independently.

The distance between the modules 1 is adjusted as required. These modules are each associated with a load and deflection block 40 for drops ejected at the nozzle 12. By way of example, on FIG. 4, a variant of the embodiment for a multi-nozzle device according to the invention is represented whereby, for the sake of more clarity, a module 1 appears in a position disconnected from the load and deflection block 40, and a second module 1 is, conversely, shown associated with the said block 40.

The various deflection and load blocks 40 slide along a plate 410 and are centered by a centering device 41 before being locked at the selected distance. They comprise an aperture through which passes the jet of drops ejected at the corresponding nozzle 12. These drops pass a load electrode 43 and a load control electrode 44 before being deflected by the deflection electrodes 45 and 46.

Means 50 for associating the modules 1 with the load and deflection block 40 are provided so that the previously described adjustments according to ($\alpha$) and ($\beta$)

can be effected without difficulty following association. This involves, for example, a stirrup 51 crossed at the orifices 10 by the spindles 31 ensuring the adjustment according to (β). One of the legs of this stirrup is integral with the module 1 and the other is rendered so, for example, by a set of screws 60, with the deflection and load block 40 concerned. At any given moment, the orientation of the jet can thus be regulated and centered so as to perfectly pass into the aperture 42. On FIG. 4 are shown two attached blocks 40 and a third block 40 distanced from the two others. Indeed, all combinations are possible owing to the modular nature of the device. Note should be taken of firstly the small spatial requirement of the device and secondly and more particularly, as remarked upon earlier, the orientation of the jet of the complete rotation of the ink feed chamber.

The applications of such multijet devices are numerous, including, in particular, that of being able to quote postal addressing. Indeed, if with one jet it is only possible to print one or two lines, with four jets it is possible to print up to eight lines. It is also possible to modify the distances of printed lines without changing the machine and, by attaching modules, obtain very wide marking by the addition of several lines, which is extremely effective for producing bar codes which are higher than those obtained with conventional devices.

I claim:

1. Multinozzle ink projection writing device, characterized in that each nozzle (12) belongs to a module (1) comprising a body (4) fitted with an ink feed (2) and a drain outlet (3) and working in conjunction with a gun (5) bearing the ink piezoelectric excitation means (100), this gun being equipped at its periphery with two sets of O-ring seals (22,23) and (24,25) respectively demarcating the draining and feed chamber so that the orientation of the jet in relation to the orifice of the ink drop ejection nozzle (12) can be adjusted by rotating the ink feed chamber according to an angle (α) capable of varying from 0° to 360°, each of these modules (1) comprising an orifice (10) designed to receive a spindle (31) around which the module can rotate according to an angle (β).

2. Device according to claim 1, characterized in that it comprises a number of modules (1) each working in conjunction with a deflection and load block (40), the distance of the "module (1) plus block (40)" pairings itself being able to be modified.

3. Device according to claim 2, characterized in that each module (1) is made integral with the deflection and load block (40) which is connected to it by an integrating means (50) which does not impede the clearance of each module according to the degrees of freedom (α) and (β).

4. Device according to claim 1 characterized in that at the time of draining, the gun (5) can be replaced by a hollow tube fitted with the said O-ring seals (22,23) and (24,25), this hollow tube not being fitted with the nozzle (12).

5. Device according to claim 2, characterized in that at the time of draining, the gun (5) can be replaced by a hollow tube fitted with the said O-ring seals (22,23) and (24,25), this hollow tube being fitted with the nozzle (12).

6. Device according to claim 3, characterized in that at the time of draining, the gun (5) can be replaced by a hollow tube fitted with the said O-ring seals (22,23) and (24,25), this hollow tube being fitted with the nozzle (12).

* * * * *